United States Patent [19]

Ohno et al.

[11] Patent Number: 4,498,754
[45] Date of Patent: Feb. 12, 1985

[54] SINGLE LENS REFLEX CAMERA

[75] Inventors: Yoshimi Ohno, Kawasaki; Ikuya Tsurukawa; Tokio Ishino, both of Yokohama, all of Japan

[73] Assignee: Ricoh Company, Ltd., Tokyo, Japan

[21] Appl. No.: 457,382

[22] Filed: Jan. 12, 1983

[30] Foreign Application Priority Data

| Jan. 25, 1982 | [JP] | Japan | 57-9675 |
| Jan. 25, 1982 | [JP] | Japan | 57-9676 |
| Feb. 12, 1982 | [JP] | Japan | 57-20940 |
| Feb. 15, 1982 | [JP] | Japan | 57-22232 |
| Feb. 15, 1982 | [JP] | Japan | 57-22233 |
| Feb. 26, 1982 | [JP] | Japan | 57-27085[U] |

[51] Int. Cl.³ .............................. G03B 7/099
[52] U.S. Cl. .................................... 354/479
[58] Field of Search ............... 354/400–409, 354/479, 480

[56] References Cited

U.S. PATENT DOCUMENTS 4,391,513  7/1983  Fujiki .................. 354/407 X
4,427,277  1/1984  Haraguchi ............. 354/402

Primary Examiner—William B. Perkey
Attorney, Agent, or Firm—Oblon, Fisher, Spivak, McClelland & Maier

[57] ABSTRACT

A quick mirror return mechanism includes a return spring and a quick return setting member, which are formed, in the region where they abut against each other, so that as the return spring is stressed, the resilient force of the return spring is directed closer to the direction in which a setting pawl moves. A main mirror for a finder, a stationary member, a mirror-up lever, a main mirror drive, a sub-mirror and a sub-mirror driver form together a six-bar linkage wherein the main mirror moves upward while swinging back and the sub-mirror moves into overlapping relationship with the main mirror when the latter has completed its upward movement. The quick return mechanism which is biased with an increased force is disposed on a front panel of a camera, thus preventing any excessive force from being applied to a mirror box. A light receiving element unit is disposed in the bottom of the mirror box. A light receiving element unit is disposed in the bottom of the mirror box, and is arranged on a substrate, tilting of which can be separately adjusted in the fore-and-aft and lateral or left-and-right direction by adjusting the angular positions of a first and a second lever.

5 Claims, 19 Drawing Figures

SINGLE LENS REFLEX CAMERA

BACKGROUND OF THE INVENTION

1. Field of the Invention

The present invention relates to a camera, and more particularly to a single lens reflex type camera.

2. Description of the Prior Art

Almost any single reflex camera is provided with a quick return mechanism for a mirror associated with a finder. Such quick return mechanism comprises a quick return setting member, a mirror-up spring and an associated return spring, a setting pawl, and a mirror-up member. A shutter charging operation energizes or stresses both the mirror-up spring and the return spring while bringing the quick return setting member to its set position where it is locked by the setting pawl. A shutter release causes the mirror-up member to be initially actuated under the resilience of the mirror-up spring to drive the mirror upward, followed by unlocking the quick return setting member from the setting pawl immediately before the termination of shutter operation, allowing the setting member to be returned under the resilience of the spring until the mirror returns to its original position.

Unlocking of the setting member from the setting pawl takes place immediately before the termination of a shutter operation with the aid of the force of a focal plane shutter, for example. However, the magnitude of such force is low, and therefore it is necessary that the setting member, which is biased by the return spring, can be unlocked under as small a force as possible. This presented a limit on the magnitude of the resilience of the return spring.

Momentarily referring to FIG. 19, it is necessary that the resilience of the return spring be greater than a loading on the setting member, indicated in phantom line, over the full extent of movement. In terms of efficiency, the resilience of the return spring may slightly exceed the loading, as indicated by a solid line in FIG. 19. However, when the return spring is stressed, its resilience increases beyond a required value, as indicated by broken lines in FIG. 19, thus causing the setting member to apply an increased force to the setting pawl, which must then be unlocked under a greater force. As mentioned previously, the force used to unlock the setting pawl is limited.

As a result, in a conventional quick return mechanism for a single lens reflex camera, there is a critical balance between the resilience of the return spring and the magnitude of the force which is required to unlock the setting member, requiring a delicate adjustment during assembly.

In addition to a main mirror for the finder, certain single lens reflex cameras include a sub-mirror in order to introduce light passing through a portion of the main mirror onto a light receiving element used for exposure control or onto a light receiving element used for distance determination. In certain arrangements, a mirror of an increased size is used to prevent a vignetting effect of the field of view of the finder, by swinging the main mirror back during the mirror-up mode (see Japanese Laid-open Patent Application No. 144,122/1977). However, a conventional mirror drive mechanism for single lens reflex camera which is provided with a sub-mirror and a main mirror arranged to be swung back as mentioned above requires a bias swing force supplied from a spring, and hence involves an increased amount of loss of force. A problem then arises that an increased force is required to drive the mirror. In addition, the operating condition and the accuracy achieved of the mirror can be checked only after the entire mechanism is assembled into a mirror box, causing inconvenience in assembly and adjustment.

In a conventional single reflex camera, it is common to position a quick return mechanism for the mirror of the finder on the bottom of and inside a mirror box. However, the recent trend is toward the provision of a light receiving element internally within the bottom of the mirror box so that such element determines light passing through the main mirror and reflected by the sub-mirror to control the exposure process or to determin the distance. This prevents the disposition of the quick return mechanism within the bottom of the mirror box. Accordingly, such quick return mechanism is disposed outside the bottom of the mirror box in certain arrangements. However, at any rate, the quick return mechanism must be charged by stressing both the mirror-up spring and the return spring, and this causes a force of a relatively high magnitude to be applied to the mirror box in the lateral direction, resulting in the drawback that the mirror box may be deformed, in particular, when the mirror box is assembled from pressed parts. This resulted in changing the position of the finder mirror to cause a defocusing of the finder or in causing a defocusing of the surface of the light receiving element to prevent an accurate distance determination being achieved if such element is positioned within the mirror box.

In certain single lens reflex cameras, incident light passing through a receiving lens is caused to impinge on a light receiving element which is used for exposure control or for distance determination, by causing part of such incident light to be reflected by a sub-mirror, located rearwardly of the main mirror, after such light has passed through the main mirror. It is required that the light receiving surface of such element does not exhibit any tilting with respect to the optical axis of incidence to avoid partial blurring in order for an accurate photometry or distance measurement to be performed. The tilting of the light receiving surface of such element may occur with respect to the optical axis of incidence in either the left-and-right direction or the fore-and-aft direction, as viewed from the front side of the camera. In the prior art practice, such tilting is adjusted by the use of adjusting screws which abut against the light receiving element at three points.

While such adjusting mechanism of the prior art is simple in construction, the actual adjustment is greatly troublesome in that adjustment of the tilting in the left-and-right direction, for example, causes a change in the tilting in the fore-and-aft direction and vice versa. For focusing adjustment of the light receiving element which is used to determine the distance, the three adjusting screws must be turned simultaneously an equal amount, which involves great difficulty in avoiding any resulting tilting. If optical means such as collimator is used to perform such adjustment, the tilting in the left-and-right and the fore-and-aft direction can be evaluated simultaneously, and hence the degree of difficulty of adjustment can be lessened. However, for the light receiving element which is used to determine the distance, the electrical evaluation is employed. Since the evaluation of the tilting in the left-and-right direction and the evaluation of the tilting in the fore-and-aft direction takes place separately, it is necessary to switch electrical outputs for evaluation in order to confirm any change in the tilting in one direction which results from the adjustment in the other direction, thus resulting in a very troublesome operation.

In a single lens reflex camera of internal photometry type in which light passing through a taking lens is utilized to derive a distance signal, it is desirable that the light receiving element which is used to determine the distance undergoes a variety of adjustments during different stages of assembly of the camera. For example, an electrical adjustment is initially required to determine the compatability of the light receiving element with an arithmetic unit associated therewith. Subsequently when the element is assembled into the mirror box, tilting of the element is adjusted to remove a partial blurring. Later when the mirror box is assembled within the camera, the element is caused to move fore-and-aft along the optical axis in order to achieve a focusing adjustment of the element.

However, in the conventional single lens reflex cameras, it is difficult to derive an electrical signal from the light receiving element out of the camera once such element or the mirror box in which it is disposed is assembled within the camera. No proper adjustment can be made unless the light receiving element is assembled within the mirror box. This evaluation is enabled only after the mirror box has been assembled. It thus becomes difficult to perform the adjustment since such takes place on the basis of such evaluation. On the other hand, if the element fails to exhibit a desired characteristic after it has been assembled and hence must be changed, replacement of the element and a processing circuit to which it is directly fixed is not a simple matter to perform.

SUMMARY OF THE INVENTION

It is a first object of the invention to provide a single lens reflex camera having a quick return mechanism within high operational reliability and in which a quick return setting member can be positively unlocked if a return spring has a sufficiently high resilience or if the magnitude of the force available to unlock the setting member is low, thereby eliminating the need for delicate adjustment between the resilience of the return spring and the magnitude of the force which is required to unlock the setting member.

It is a second object of the invention to provide a single lens reflex camera including a mirror drive mechanism having a sub-mirror and arranged to cause swing-back of a main mirror, but in which the mechanical loss is substantially eliminated, thus allowing the mirror to be driven with a force of reduced magnitude.

It is a third object of the invention to provide a single lens reflex camera including a mirror drive mechanism which has a sub-mirror and arranged to cause swing-back of a main mirror, which mirror drive mechanism can be assembled into a single unit, thereby permitting the operative condition or the accuracy of the mirror to be checked for the unit when the mirror drive mechanism is not yet assembled into a mirror box.

It is a fourth object of the invention to provide a single lens reflex camera including a quick return mechanism which is arranged in a manner to prevent any force externally applied to set the mechanism from being transmitted to a mirror box, thereby avoiding any misalignment or refocusing of a finder or the surface of a light receiving element.

It is a fifth object of the invention to provide a single lens reflex camera including a tilt adjusting mechanism which permits tilting of a light receiving element in the fore-and-aft direction and in the left-and-right direction to be adjusted independently, thus allowing a reduction in the length of time required for the adjustment and hence the production cost thereof.

It is a sixth object of the invention to provide a single lens reflex camera including a light receiving element unit having a light receiving element and an associated processing circuit to determine the distance to an object being photographed and which enables a degree of adjustment and/or determination of the performance of the element and the processing circuit even before they are assembled into a mirror box, which enables an electrical evaluation, and hence a variety of adjustments, after the element and the processing circuit are assembled into a camera, and which permits replacement of the element and the processing circuit, once assembled, in a facilitated manner.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
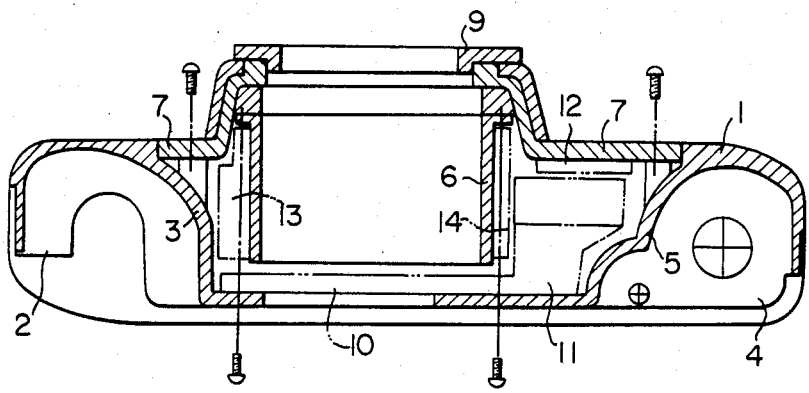
FIG. 1 is a plan view, partly in transverse section, of an embodiment of the invention.
Figure 2:
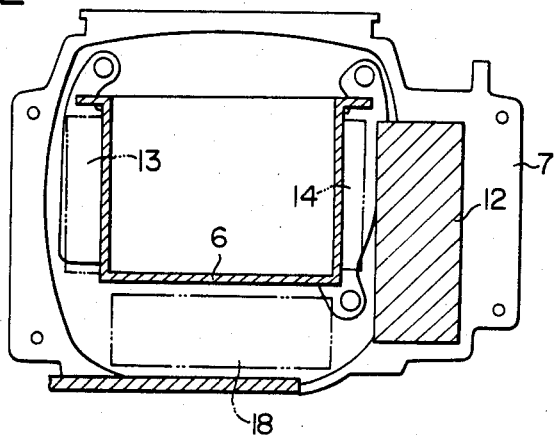
FIG. 2 is a rear view, partly in vertical section, of a portion of the embodiment shown in FIG. 1.
Figure 3:
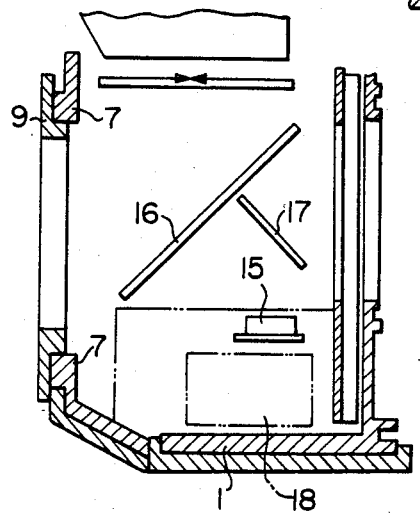
FIG. 3 is an elevational section of the portion illustrated in FIG. 2.

Referring to FIGS. 1 to 3, there is shown a camera including a body 1 in which a film magazine chamber 2 is defined by a wall 3 and a film take-up chamber 4 is defined by a wall 5. A mirror box 6 is mounted in a recess located intermediate the walls 3, 5. A front panel 7 is secured to the front side of the body 1 so as to cover the front of the mirror box 6 also. In a region covering the mirror box 6, the front panel 7 has a body mount 9 secured to its front side, in which the mount of a taking lens is mounted. A shutter unit 11 which operates to open or close a focal plane shutter 10 is disposed in a space defined by the wall 5 and the right-hand sidewall, as viewed in FIG. 1, of the mirror box 6. A quick return mechanism 12 is mounted on the inside of the front panel 7 while a mirror drive mechanism 13, 14 is disposed on the opposite sides of the mirror box 6. A light receiving element 15 is disposed within the bottom of the mirror box 6, and a part of light passing through a taking lens transmits through a main mirror 16 associated with a finder and is then reflected by a sub-mirror 17 for incidence on the element 15. A signal from the element 15 is effective to operate an exposure control unit or a distance determining unit, the electrical circuit of which is schematically indicated at 18.

Figure 4:
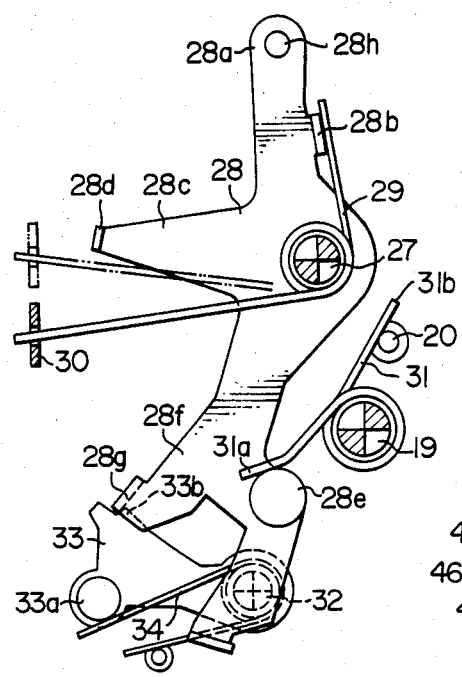
FIG. 4 is a rear view of a quick return mechanism used in the embodiment of FIG. 1.

The construction of the quick return mechanism 12 and the mirror drive mechanism 13, 14 will now be more specifically described with reference to FIGS. 4 to 7. In FIG. 4, there is shown a stationary shaft 27 on which a quick return setting lever 28 is rotatably mounted. The lever 28 is adapted to rotate clockwise in response to film winding operation. A mirror-up spring 29 is disposed on the shaft 27 and has its one end bearing against a bend 28b of an arm 28a of the lever while its other end extends through a mirror-up intermediate lever 30, to be described later. Consequently, as the lever 28 rotates clockwise, the spring 29 is stressed. An arm 28c extends laterally from the lever 28 and has its free end 28d formed as a bend, and one end of the spring 29 is located on a path of movement of the bend 28d. A pin 28e is fixedly mounted on the lever 28, and one end 31a of a return spring 31, disposed on a stationary shaft 19, abuts against the pin, while its other end 31b bears against a pin 20 which is fixedly mounted on the front panel 7 (see FIG. 1). As the lever 28 rotates clockwise as viewed in FIG. 4, the spring 31 is stressed. The lever 28 has a further arm 28f, the lateral edge of which is formed with a bend 28g. Shown in the bottom portion of FIG. 4 is stationary shaft 32, on which a setting pawl 33 is rotatably mounted. The setting pawl 33 has a pin 33a which is engaged by a spring 34, the resilience of which urges the pawl 33 to rotate clockwise, as viewed in FIG. 4. In the condition shown, the pawl has rotated until a detent step 33b formed thereon engages the bend 28g of the lever 28 to lock it, thus preventing a returning angular movement of the lever 28 while maintaining both the mirror-up spring 29 and the returning spring 31 in a stressed condition. As will be described later, the setting pawl 33 is unlocked or disengaged from the bend 28g of the lever 28 in response to the pin 33a being driven downward by the force of inertia of the running second blind of a focal plane shutter immediately before the termination of a shutter operation.

Figure 5:
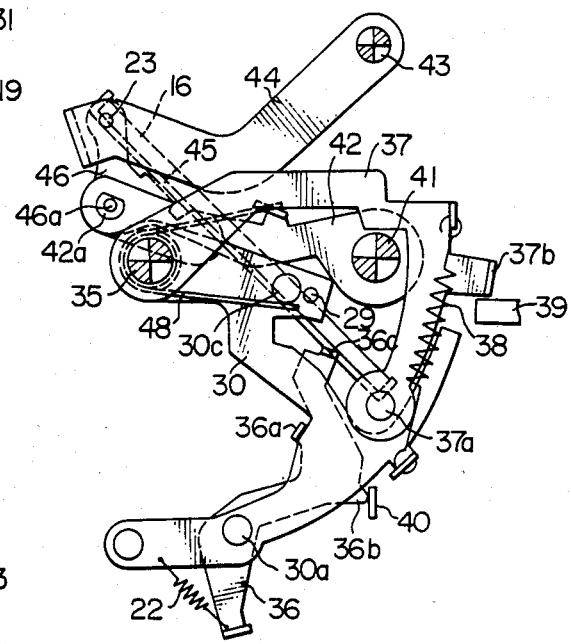
FIG. 5 is a side elevational view of a mirror drive mechanism of the embodiment of FIG. 1.

Referring to FIG. 5, the mirror-up intermediate lever 30, through which one end of the spring 29 extends, is rotatably mounted on a stationary shaft 35 which is mounted on the mirror box 6 (FIG. 1) and includes an arcuately and downwardly extending portion carrying a pivot 30a adjacent to its free end, on which a release lever 36 is rotatably mounted. Also rotatably mounted on the shaft 35 is an automatic diaphragm lever 37, with a tension spring 38 extending between the lever 37 and the intermediate lever 30. The lever 37 has a substantially inverted L-shaped configuration and fixedly carries a pin 37a on its free end, which is driven upward by the lateral edge of the lever 30 as the latter rotates counterclockwise in FIG. 5. The lever 37 is formed with a bend 37b, against which an automatic diaphragm pin associated with a taking lens abuts. The pin 39 is normally urged by the bend 37b to assume an open diaphragm position, but as the lever 37 rotates counterclockwise, the pin 39 moves in the following relationship to control the diaphragm aperture to a given value. A spring 22 extends between the release lever 36 and the intermediate lever 30, thus urging the lever 36 to rotate clockwise about the pivot 30a. However, in the condition shown, a bend 36a formed thereon bears against the lever 30 to limit the resulting angular movement. Also, a projection 36b on the release lever engages a stationary detent 40, thus preventing further rotation of the lever 30 in the counterclockwise direction. The lever 36 is adapted to be driven to the left, as viewed in FIG. 5, when a bend 36c, formed at one end thereof, is engaged by a release member, to be described later. When the bend 36c of the lever 36 is driven to the left, the projection 36b is disengaged from the detent 40, whereupon a rotation of the lever 30 in the counterclockwise direction is permitted. A mirror-up lever 42 is rotatably mounted on a stationary shaft 41 which is located to the right of the shaft 35. The mirror-up lever 42 is disposed on a path of movement of a pin 30c which is fixedly mounted on the lever 30, and as the lever 30 rotates counterclockwise, the pin 30c raises the lever 42 to cause it to rotate clockwise. A stationary shaft 43 is loated above the shaft 41 and rotatably carries a mirror drive plate 44, the free end of which fixedly carries a pivot 23 which allows rotation of the mirror 16. The mirror drive plate 44 is U-shaped in plan view so as to surround the mirror box 6, and is rotatably supported by a combination of the shaft 43 and another shaft 43' (FIG. 7) which is aligned with the shaft 43. A combination of the pivot 23 and another pivot 23' which is aligned therewith rotatably carries the mirror 16. The mirror 16 is mounted on a mirror frame 45, and a mirror support plate 46 is fixedly mounted on the side of the frame, as clearly shown in FIG. 6. The mirror support plate 46 fixedly carries a pin 46a which is loosely fitted into a D-shaped slot 42a formed in the mirror-up lever 42 adjacent to the free end thereof. As the lever 42 rotates clockwise, as viewed in FIG. 5, the pin 46a is driven upward by the edge of the slot 42a as is the mirror support plate 46. The path of movement of the pivots 23, 23' is controlled by angular movement of the mirror drive plate 44, whereby the mirror 16 as a whole undergoes backswing. Simultaneously, as the pin 46a is driven upward, the mirror 16 rotates counterclockwise about the pivots 23, 23', thus achieving a mirror-up movement. A spring 48 extends between the lever 30 and the lever 42, urging these levers toward each other.

Figure 6:
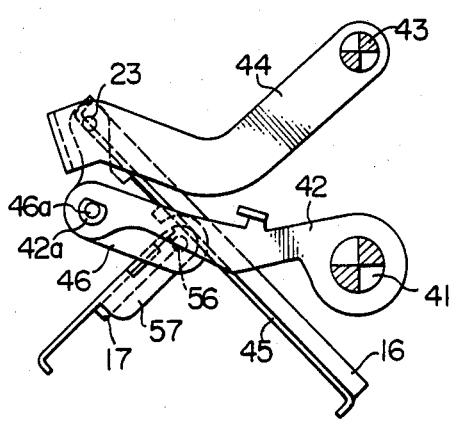
FIG. 6 is a side elevational view of the mirror-up mechanism of the embodiment of FIG. 1.
Figure 7:
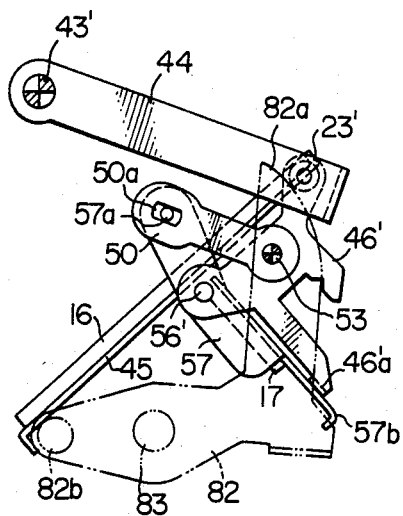
FIG. 7 is a side elevational view of the mirror-up mechanism, as viewed from the opposite side from the view of FIG. 6.
Figure 8:
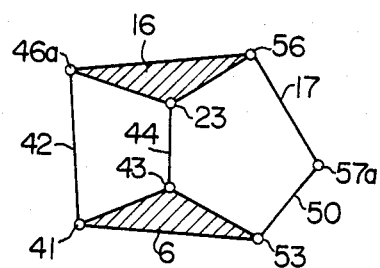
FIG. 8 is a schematic illustration of a linking relationship utilized in the mirror-up mechanism.

Referring to FIGS. 6 and 7, another main mirror support plate 46' is secured to the side of the frame 45 which is opposite the side to which the support plate 46 is secured. On the rear side of the main mirror 16, a sub-mirror frame 57 which integrally carries the sub-mirror 17 is rotatably mounted on a pair of pins 56, 56' which are fixedly mounted on the support plates 46, 46' in alignment with each other. A sub-mirror control plate 50 is pivotally mounted on a stationary shaft 53 which is located above the pin 56' and displaced to the right, as viewed in FIG. 7. A portion of the sub-mirror frame 57 extends upward and to the left, as viewed in FIG. 7, with a pin 57a fixedly mounted on its free end. The pin 57a is loosely fitted into an elongated slot 50a formed in one end of the sub-mirror control plate 50. A combination of the mirror box 6 which represents a stationary member, the mirror-up lever 42, the main mirror drive plate 44 and the main mirror support plate 46 together forms a four-bar linkage as shown in the left-hand half of FIG. 8 in which rotation of the mirror-up lever 42 clockwise, as viewed in FIG. 6, causes the main mirror 16 to be driven upward while swinging back. The sub-mirror 17 and the sub-mirror control plate 50, when added to the four-bar linkage, form together a six-bar linkage as shown in FIG. 8 in which as the main mirror 16 is driven upward, the sub-mirror rotates about the pivots 56, 56' into overlapping relationship with the main mirror 16.

Figure 9:
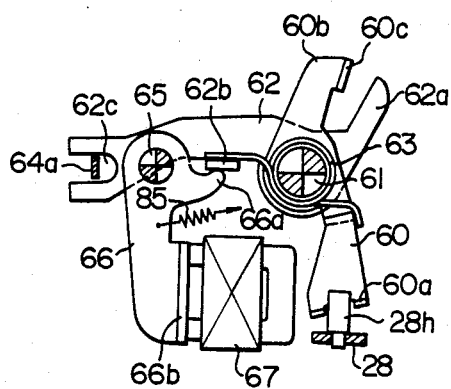
FIG. 9 is a plan view of a release mechanism of the embodiment of FIG. 1.
Figure 10:
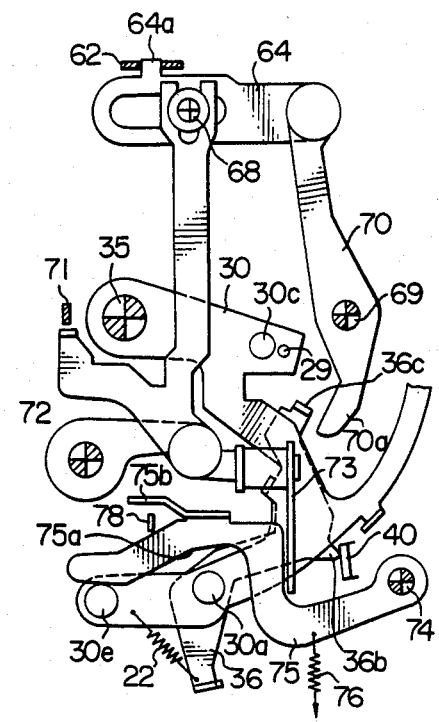
FIG. 10 is a side elevational view illustrating the relationship between the release mechanism and the mirror drive mechanism.
Figure 11:
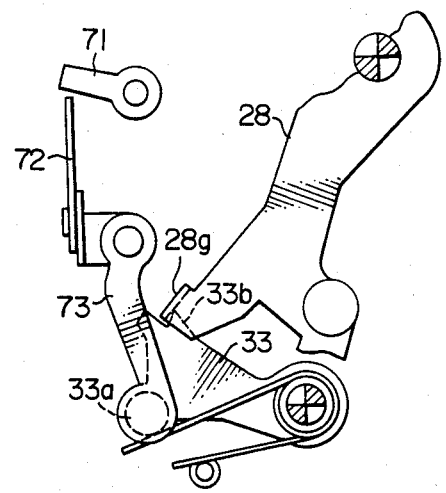
FIG. 11 is a rear view illustrating the relationship between a shutter assembly and the quick return mechanism.

Referring to FIGS. 9 to 11, connection with the shutter unit will now be described. The quick return setting lever 28 includes a pin 28h, which extends through a bend 60a formed in one end of a charging lever 60, as shown in FIG. 9. The charging lever 60 is rotatably mounted on a stationary shaft 61, on which a lever 62 is also rotatably mounted. The lever 60 has another arm 60b, along the lateral edge of which is formed a bend 60c which is located opposite to one arm 62a of the lever 62. The lever 62 is formed with a bend 62b, and a spring 63 extends between the bend 62b and the lever 60 to urge both of the levers 60, 62 angularly in a direction to cause their arms 60b, 62a to abut against each other. The other arm of the lever 62 has a forked end 62c, which receives a projection 64a extending from a release relay member 64, which is best shown in FIG. 10. An iron piece lever 66 is rotatably mounted on a stationary shaft 65 and has a projection 66a which is urged into abutment against the bend 62b of the lever 62 under the resilient force of a spring 85. On its free end, the lever 66 carries an iron piece 66b, which is adapted to be attracted by an electromagnet 67 of permanent magnet type. In the condition shown, the combination of the attraction of the electromagnet 67 and the bias supplied by the spring 85 to urge the lever 66 for rotation overcomes the bias supplied by the spring 63 to allow the lever 66 to rotate counterclockwise, whereby the iron piece is held attracted to the electromagnet. However, when the electromagnet 67 is energized in response to a release operation of the camera, the attraction is removed, whereby the lever 66 rotates clockwise under the resilience of the spring 63, which urges the lever 62 for rotation, and against the resilience of the spring 85.

In FIG. 10, the release relay member 64 can move transversely under the guiding action of a stationary pin 68. A release intermediate lever 70 is rotatably mounted on a stationary shaft 69, and has its one end pivotally connected with the release relay member 64. The release lever 36 has the bend 36c which is located on a path of movement of the other end 70a of the lever 70.

Referring to FIGS. 10 and 11, a mirror return lever 71 is disposed within a shutter unit and is adapted to be driven for angular movement by a force of inertia of the running second blade of the shutter. The angular movement of the mirror return lever 71 causes a first quick return lever 72 and a second quick return lever 73 to be driven downward. The lever 73 is pivotally mounted on the pin 33a of the setting pawl 33, and as the lever 73 is driven downward, the setting pawl 33 moves angularly to unlock the bend 28g of the quick return setting lever 28 from the detent step 33b.

In FIG. 10, a shutter lever 75 is rotatably mounted on a stationary shaft 74 and is urged by a spring 76 to rotate counterclockwise, whereby the free end of the lever 75 bears against a pin 33e fixedly mounted on the free end of the mirror-up intermediate lever 30. A portion of the lever 75 close to the free end thereof is formed to extend along the direction in which the pin 30e on the intermediate lever 30 moves so that the lever 75 does not undergo an angular movement during the initial phase of the rotation of the intermediate lever 30 in the counterclockwise direction. However, a recess 75a is formed in the lever 75 to permit the lever 75 to rotate counterclockwise as the intermediate lever 30 further rotates in the counterclockwise direction. The lever 75 is formed with a branch 75b, which drives a shutter release element 78 downward to cause shutter release as the lever 75 rotates counterclockwise.

It is to be noted that in FIG. 7, the position of the main mirror 16 can also be adjusted to thereby adjust the focusing of the finder, by producing an angular movement of a positioning member 82 in the form of a bell crank, shown in phantom line, about its axis 83 to change a point on a lateral edge 82a, formed adjacent one end thereof, where the pin 23' abuts and to change a point on the main mirror frame 45 where a pin 82b formed on the other end of the positioning member 82 abuts. Such positional adjustment of the main mirror 16 is made possible by coupling the mirror-up lever 42 and the main mirror 16 through a loosely fitting engagement between the pin 46a and the D-shaped slot 42a, the extent of the adjustment being determined by the loose fitting between these members. After the adjustment, the positioning member 82 is secured to the mirror box 6. The location of the sub-mirror 17 is determined by the abutment of the lateral edge 46a', at one end, of the main mirror support plate 46' against the rear side of the sub-mirror frame 57.

Operation of the various mechanisms will now be described. It is to be understood that these mechanisms are shown in their conditions which they assume when a film winding operation has been completed. Specifically, in FIG. 4, the quick return setting lever 28 has rotated clockwise to thereby stress both the mirror-up spring 29 and the return spring 31. Under the bias applied thereto, the setting pawl 33 has moved angularly to bring its detent step 33b into engagement with the bend 28g on the lever 28, thus blocking a returning motion of the lever 28. As a result of the described rotation of the lever 28, the pin 28h positioned thereon has caused the lever 60 to rotate counterclockwise, as viewed in FIG. 9, thus stressing the spring 63.

Figure 12:
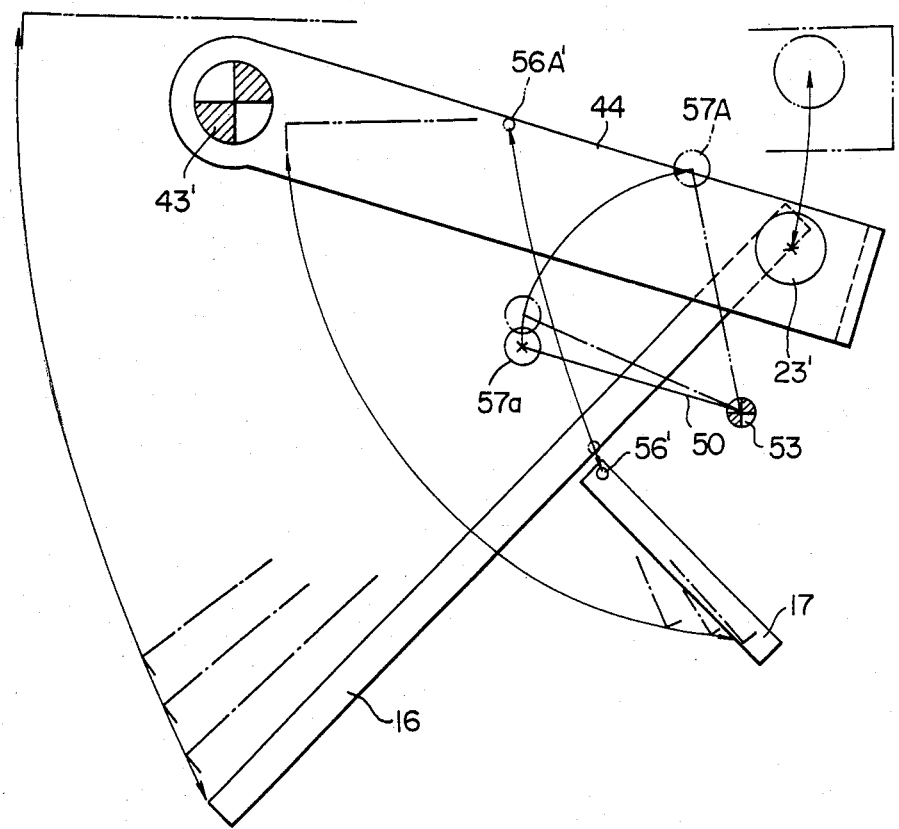
FIG. 12 is a side elevational view illustrating movement of various parts of the mirror drive mechanism.

When a shutter release operation takes place, the electromagnet 67 is energized to lose its attraction, whereby the iron piece lever 66 is caused, by the angular movement of the lever 62 which occurs with the aid of the spring 63, to rotate clockwise against the resilience of the spring 85, thus allowing clockwise rotation of the lever 62. In response to such movement of the lever 62, the release relay member 64 moves to the right, as viewed in FIG. 10, causing the release intermediate lever 70 to rotate clockwise. The end 70a of the lever 70 pushes against the bend 36c on the lever 36 to rotate it counterclockwise so as to disengage the projection 36b from the detent 40, thereby allowing counterclockwise rotation, as viewed in FIG. 10, of the mirror-up intermediate lever 30 under the resilience of the mirror-up spring 29. The angular movement of the lever 30 causes its pin 30c to drive the mirror-up lever 42 upward, which therefore rotates clockwise, as viewed in FIGS. 5 and 6. During the initial phase, rotation of the mirror-up lever 42 only causes an angular movement of the lever 42 within the extent of the D-shaped slot 42a, without any influence upon other elements. However, after the initial phase, the edge of the slot 42a drives the pin 46a upward, whereby the main mirror support plates 46, 46' which are substantially integral with the pin 46a, the main mirror frame 45 and the main mirror 16 are driven upward, and the joint defined by the pin 23' is also driven upward to cause angular movement of the main mirror drive plate 44, thus achieving swing-back of the main mirror 16. Simultaneously with the swing-back of the main mirror, the pin 46a is driven upward and to the right, as viewed in FIG. 6, whereby the main mirror 16 and its integral main mirror frame 45, and the main mirror support plate 46 rotates counterclockwise about the pin 23, as viewed in FIG. 6 or clockwise as viewed in FIG. 7, causing the main mirror 16 to move upward and thus to be retracted out of a light receiving path. As the main mirror 16 swings back and moves upward, the sub-mirror 17 moves in following relationship therewith. However, since the frame 57 is joined to the sub-mirror control plate 50 through the pin 57a, the path of movement of the pin 57a is controlled in a manner such that although the pin 57a is initially located above and to the left of the pin 56', the pin 56' will be located slightly above and to the left of the pin 57a at the completion of the upward movement of the main mirror, as indicated up reference characters 56A', 57A in FIG. 12, thus allowing the sib-mirror 17 to be retracted out of the taking light path while it assumes its overlapping relationship with the underside of the main mirror 16.

At the same time, the pin 37a on the lever 37 is pushed up by the lever 30, whereby the lever 37 rotates counterclockwise, as viewed in FIG. 5, controlling a diaphragm aperture to a given value. After a degree of angular movement of the lever 30, the pin 30e on the lever 30 will be located opposite to the recess 75a formed in the shutter lever 75, whereby the lever 75 rotates counterclockwise, as viewed in FIG. 10, with its branch 75b pushing against the shutter release element 78 to drive it down, thus actuating the shutter. In the present embodiment, the shutter used comprises a focal plane shutter including a first and a second blind, both of which may be retained by a pair of electromagnets. In response to the operation of the shutter release element 78, the first blind is released from the constraint by one of the electromagnets to begin running after a given time interval, required for the upward movement of the mirror and for controlling diaphragm blades to a given aperture, and after a further interval, the second blind is released from the constraint by the other electromagnet to begin running.

Immediately before the termination of the shutter operation, the force of inertia created by the running second blind of the focal plane shutter causes the mirror return lever 71 to rotate counterclockwise, as viewed in FIG. 11, whereby the first and the second quick return lever 72 73 are driven downward and the setting pawl 33 is caused to rotate counterclockwise, as viewed in FIGS. 4 and 11. Such rotation of the setting pawl 33 causes the step 33b to be disengaged from the bend 28g on the quick return setting lever 28, whereupon the lever 28 returns by rotating counterclockwise, as viewed in FIG. 4, under the resilience of the return spring 31. As the lever 28 returns, the bend 28d formed thereon drives one end of the spring 29 downward, which in turn drives the lever 30 downward, allowing the lever 30 to rotate clockwise, as viewed in FIGS. 5 and 10. Such rotation of the lever 30 stresses the spring 48, the resilient force of which causes counterclockwise rotation of the lever 42, thus returning the main mirror 16 and the sub-mirror 17 to their original positions. At the same time, rotation of the lever 30 stresses the spring 38, which causes the lever 37 to rotate clockwise, as viewed in FIG. 5, thus driving the automatic diaphragm lever 39 to establish an open diaphragm aperture for the lens. The clockwise rotation of the lever 30 also causes the lever 36 to move, whereby the projection 36b thereon falls to a point located to the left of the detent 40, thus preventing the lever 30 from rotating counterclockwise. On the other hand, the returning motion of the quick return setting lever 28 causes the lever 60 to rotate clockwise, as viewed in FIG. 9, whereby the resilient force of the spring 63 diminishes. The bend 60c on the lever 60 pushes against the arm 62a of the lever 62, which therefore rotates clockwise, accompanying a counterclockwise rotation of the iron piece lever 66 under the resilience of the spring 85 to allow the iron piece 66b to be held attracted by the electromagnet 67. Angular movement of the lever 62 also causes the release relay member 64 to move to the left, as viewed in FIG. 10, thereby returning the lever 70 to its original position. In this manner, every member resumes its normal position. In response to another film winding operation, the mirror-up setting lever 28 and its associated members assume positions shown in FIGS. 4, 9 and 11.

It will be understood from the foregoing description that the quick return setting lever and its associated return spring are configured, in their abutting region, such that the resilience of the spring is directed closer to the direction of movement of the setting pawl as the return spring is stressed. This allows the quick return setting member or lever to be unlocked with a force of reduced magnitude, thus eliminating the need for delicate adjustment between the resilient force of the return spring, and the magnitude of force required to unlock the quick return setting member. Accordingly, the quick return mechanism experiences increased operational reliability.

The use of the six-bar linkage to achieve the swing-back of the main mirror and the upward movement of the main mirror and the sub-mirror dispenses with a complex leverage or cam mechanism as used in the prior art mirror drive mechanism and requires no resilient bias with consequent reduction in the mechanical loss, thus allowing a mirror drive mechanism for a single lens reflex camera to be provided in which the mirror can be driven with a force of reduced magnitude. The fact that a joint between the main mirror and the mirror-up lever is defined by a loosely fitting engagement therebetween to avoid any constraint of the main mirror and the sub-mirror in their initial positions by the linkage enables an adjustment of position in the lateral direction or a tilting angle of the main mirror to eliminate partial blurring of the finding or enables translational movement of the main mirror for focusing adjustment of the finder. This allows free positional adjustment without any constraint by the linkage if the machining accuracy of various members change from member to member.

Since the quick return mechanism to which a substantial force is applied is disposed on the front panel of the camera and no substantial force is directly applied to the mirror box, any deformation of the mirror box is avoided to prevent a defocusing effect of the finder or the surface of the light receiving element if the mirror box is assembled from pressed parts.

Figure 13:
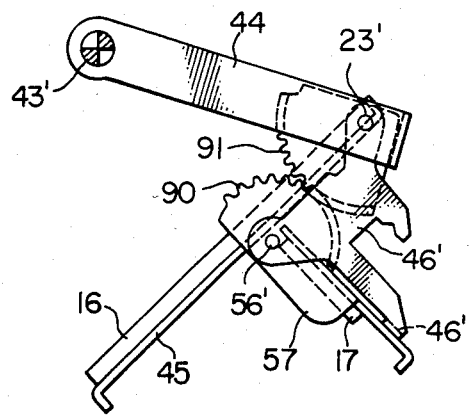
FIG. 13 is a side elevational view of another embodiment of the mirror drive mechanism.

Referring to FIG. 13, a modification of the mirror drive mechanism which may be used in the present invention will now be described. The modification is quite similar to that shown in FIG. 6 as to its arrangement on one side while the arrangement on the opposite side is changed as illustrated in FIG. 13. It is a feature of the modification that a sector gear 90 is subtantially integrally mounted on the sub-mirror frame 57 so as to be rotatable about the pivot 56' and for meshing engagement with another sector gear 91 which is substantially integrally mounted on the main mirror drive plate 44 so as to be rotatable about the pin 23'. In other respects, the arrangement is identical to the embodiment mentioned above, and hence corresponding parts are designated by like reference characters without repeating their description.

In operation, when the mirror-up lever 42 is operated, the main mirror frame 45 and the main mirror 16 are driven upward as is the joint defined by the pin 23', causing the main mirror 16 to swing back. At the same time, a four-bar linkage, comprising the main mirror 16, the mirror-up lever 42, the mirror drive plate 44 and a stationary part (not shown) causes the main mirror 16 to move clockwise about the pin 23', as viewed in FIG. 13, driving it upward to be retracted out of a light receiving path. During upward movement of the main mirror 16, the entire gear 90 moves along an arc which is centered on the pin 23' relative to the gear 91 which may be regarded as substantially stationary, thereby changing the points of meshing engagement between the gears 90, 91. The net result is that the gear 90 rotates clockwise, as viewed in FIG. 13, about the pivot 56', whereby the sub-mirror 17 which is substantially integral with the gear 90 is brought into overlapping relationship with the underside of the main mirror 26 which then assumes its upper position, and thus is retracted from the light receiving path. The returning movement of the main mirror 16 and the sub-mirror 17 to their original positions takes place by an opposite procedure to that mentioned above.

In this modification, the swing-back and the upward movement of the main mirror is achieved with the aid of the four-bar linkage. A gear which is substantially integral with the sub-mirror is disposed in meshing engagement with another gear which is substantially integral with the main mirror drive member which is utilized to produce the swing-back of the main mirror so that the upward movement of the main mirror accompanies angular movement of the sub-mirror. In this manner, the mirror drive mechanism can be constructed as a unit, which can be checked for movement and accuracy of the mirror. In this manner, there is provided a mirror drive mechanism for single lens reflex camera which facilitates its assembly and adjustment.

Figure 14:
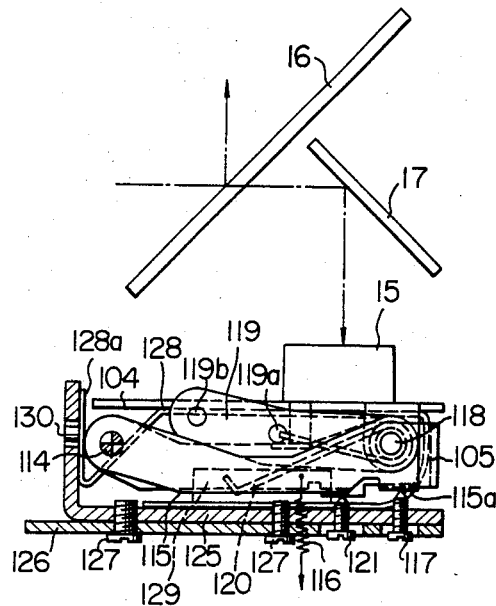
FIG. 14 is a side elevational view of a light receiving element unit of the embodiment of FIG. 1.
Figure 15:
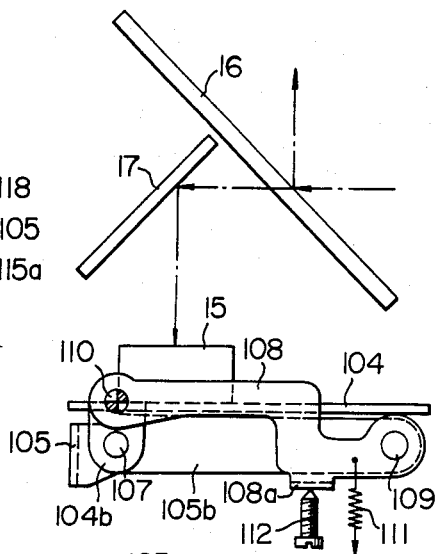
FIG. 15 is a side elevational view of the unit as veiwed in the opposite direction from that of FIG. 14.

The light receiving element unit which is used in the single lens reflex camera of the invention will now be considered. Referring to FIGS. 14 and 15, it will be noted that the main mirror 16 is disposed at an angle with respect to a path of incident light from a receiving lens. Accordingly, it reflects a majority of incident light upward to form the image of an object being photographed onto a focused glass (not shown). Part of the incident light which transmits through the main mirror 16 is reflected downwardly by the sub-mirror 17 which is located rearwardly of the main mirror 16 at an angle, for incidence onto the light receiving element 15.

Figure 16:
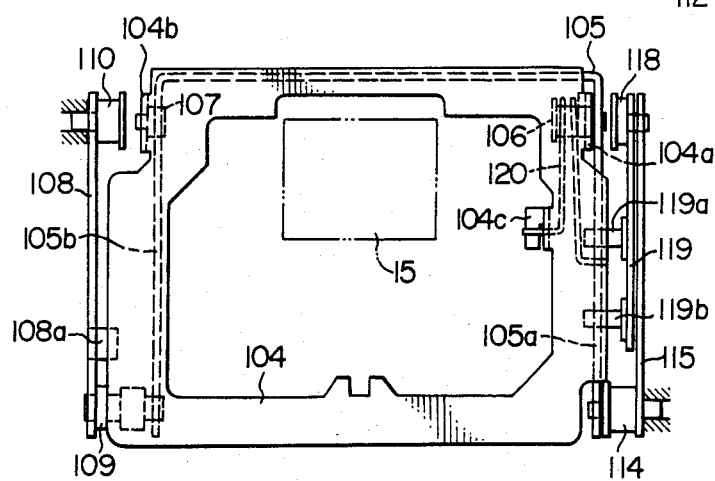
FIG. 16 is a plan view of the unit.
Figure 17:
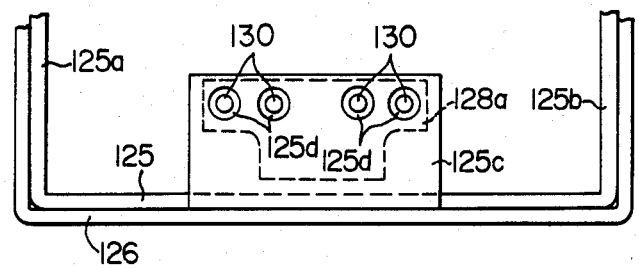
FIG. 17 is a schematic front view of the unit.
Figure 18:
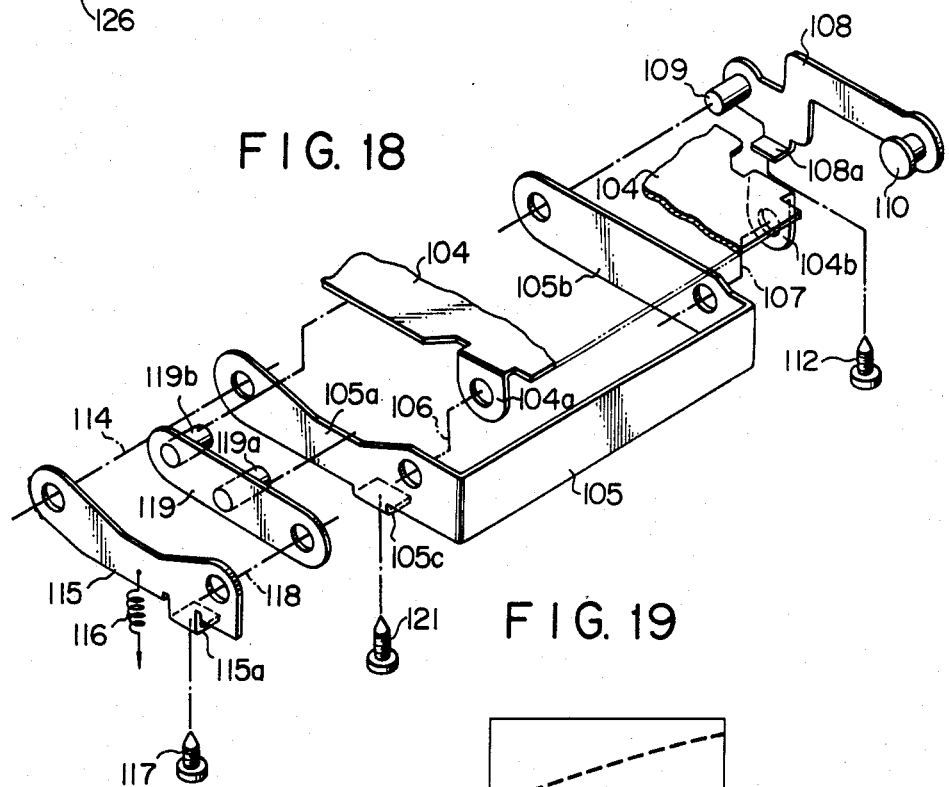
FIG. 18 is an exploded perspective view of the unit, partially illustrating in a schematic manner.
Figure 19:
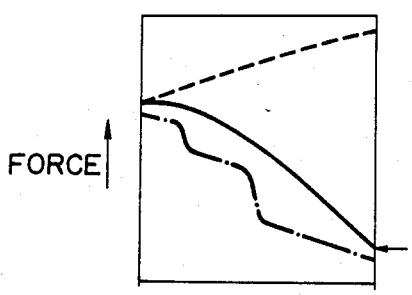
FIG. 19 graphically illustrates a change in the resilience of the spring as the quick return setting member moves.

Referring to FIGS. 14 to 18, the element 15 is disposed on a substrate 104 and secured thereto by suitable means, with its light receiving surface directed upward. An element support plate 105 which has a U-shaped configuration, as viewed in plan view, and having a pair of parallel side plates 105a, 105b is arranged below the substrate 104. The rear part of the substrate 104 or its right-hand end, as viewed in FIG. 14, or the upper part, as viewed in FIG. 16, is formed with a pair of downwardly depending bends 104a, 104b adjacent to its opposite sides, which are pivotally connected to the rear part of the side plates 105a, 105b of the support plate 105 by means of pins 106, 107. The free end of the side plate 105a is pivotally connected by means of a pin 109 to the free end of a first lever 108, which is disposed in parallel relationship with the side plate 105 and has its other end pivotally mounted on a stationary shaft 110 so as to be rotatable in a vertical plane. The first lever 108 is urged by a spring 111 to rotate clockwise about the shaft 110, as viewed in FIG. 15. However, resulting rotation is limited by the abutment of the lower surface of a bend 108a formed along the lower edge of the lever 108 against the upper end of a lateral tilt adjusting screw 112.

The free end of the other side plate 105a of the element support plate 105 is pivotally mounted on a stationary shaft 114, on which a second lever 115 is also pivotally mounted. The second lever 115 is disposed in parallel relationship with the side plate 105a and is rotatable about the shaft 114 in a vertical plane, and is urged by a spring 116 to rotate clockwise, as viewed in FIGS. 14 and 18. However, the resulting rotation is limited by the abutment of the lower surface of a bend 115a formed thereon against the upper end of a fore-and-aft tilt adjusting screw 117. A relay lever 119 is pivotally mounted on the free end of the second lever 115 by means of a pin 118 and is rotatable in a vertical plane. The relay lever 119 is located intermediate the side plate 105a and the second lever 115. The relay lever 119 carries a pair of pins 119a, 119b which are located at different radii of rotation or distances from the pin 118, with these pins extending into the space between the side plate 105a and the substrate 104. A spring 120 is disposed on the pin 106 and has one end thereof engaged with the lower edge of the side plate 105a and the other end thereof engaged with a bend 104c on the substrate 104, whereby the spring 120 urges the substrate 104 and the support plate 105 toward each other. However, the spacing between the substrate 104 and the support plate 105 is maintained by the abutment of the pin 119a on the relay lever 119 against the upper edge of the side plate 105a and the abutment of the pin 119b on the relay lever 119 against the lower surface of the substrate 104. On its lower edge, the side plate 105a is formed with a bend 105c, the lower surface of which is disposed for abutment against the upper end of a focusing adjusting screw 121.

Accordingly, by the turning the screw 121, the element support plate 105 undergoes angular movement about the stationary shaft 114, whereby the fulcrum for the substrate 104 undergoes vertical movement, tending to rotate relative to the support plate. However, as the support plate 105 moves angularly, the pin 119a on the relay lever 119 moves angularly about the pin 118 as it is driven vertically by the side plate 105a while the other pin 119b on the relay lever 119 causes vertical movement of the substrate 104 adjacent to its free end. The location of the pin 118 on the relay lever 119 and the radii of rotation of the pair of pins 119a, 119b are chosen so that the substrate 104 undergoes a translational movement in the vertical direction as the element support plate 105 moves angularly about the stationary shaft 114. Accordingly, as the screw 121 is turned, the substrate 104 and the light receiving element 102 which is integral therewith undergo a translational movement in the vertical direction while maintaining a fixed position with respect to the axis of incident light. It will be understood that the adjusting screws 112, 117 and 121 are threadably engaged with the bottom of the mirror box.

The described arrangement forms a light receiving element carrier which is provided with a tilt adjusting mechanism and a focusing adjusting mechanism for the light receiving element, and which forms a light receiving element unit together with mounting means which permits it to be mounted on the camera, as will be described later. Specifically, the stationary shafts 110, 114 which are disposed on the opposite sides of the carrier are fixedly mounted on upwardly depending limbs 125a, 125b of a fixing member 125. The adjusting screws 112, 117 and 121 are threadably engaged with the bottom of the fixing member 125 from the underside, with their free end extending into abutment against the respective bends. The fixing member 125 is secured to the bottom plate 126 of the mirror box by means of a suitable number of mounting screws 127. A printed circuit board 128 is secured to the lower surface of the substrate 104, and is electrically connected to the element 14. As shown in FIG. 14, one end of the board 128 is folded downwardly and then folded back to extend upwardly again, forming an extension 128a secured to the inside portion of a vertical limp 125c located at the front end of the fixing member 125. A suitable number of contacts 130 are fixedly mounted on the extension 128a for receiving an output signal from the element 15 to the exterior, either directly or after processing thereof. These contacts 130 extend through opening 125d formed in the vertical limb 125c of the fixing member 125 with a suitable clearance therebetween, whereby they are externally exposed as insulated from the fixing member 125. The circuit board 128 is also electrically connected to a processing circuit 129, which is secured in place within the bottom of the fixing member 125.

Assuming now that tilting of the element 15 in the lateral direction or a difference in the level of the left-hand part and the right-hand part thereof, as viewed in FIG. 16, is to be compensated for by adjusting the screw 112 as the screw 112 is turned, the bend 108a on the first lever 108 changes its vertical position, causing the lever 108 to move angularly. This changes elevation of the pin 109. Accordingly, one of the side plates, 105b, of the element support plate 105 as well as one side of the substrate 104 which is pivotally mounted on the side plate 105b moves vertically, thereby allowing tilting of the element 15 in the lateral direction to be compensated for. It is to be noted that at this time, there occurs no change in the position of the element 15 and the substrate 104 as viewed in the fore-and-aft direction or the level or the elevation of the top portion thereof, as viewed in FIG. 16. Although there is no axis for such angular movement, adjustment for the tilting in the lateral direction is permitted by a slight rattling between the support plate 105 and the shaft 114 or a slight flexure of the support plate 105 since tilting of the light receiving element which must be compensated for occurs within a very limited extent. Obviously, a pivot member to enable titlting of the support plate 105 or the like in the lateral direction may be provided, as required.

Tilting of the light receiving element 15 in the fore-and-aft direction can be compensated for by turning the adjusting screw 117. As the screw 117 is turned, the second lever 115 moves angularly to change the vertical position of the pin 118 with substantially the same effect as achieved by the angular movement of the relay lever 119 about the pin 119a. Accordingly, the elevation of the pin 119b changes. Since the elevation of the pins 106, 107 for the substrate 104 remains unchanged, this changes the level or the elevation of the free end of the substrate, thus compensating for tilting of the substrate 104 and the element 15 in the fore-and-aft direction. It is to be noted that this causes no change in the position of the substrate 104 as viewed in the lateral direction.

After tilting of the element 15 in the lateral direction as well as the form-and-aft direction has been compensated for in the manner mentioned above, the focusing adjusting screw 121 may be turned to achieve focusing adjustment so that an image is properly formed on the light receiving surface of the element 15 or so that the light receiving surface of the element assumes a position which is conjugate to a film surface. As mentioned previously, as the screw 121 is turned, both the substrate 104 and the element 15 undergo translational movement in the direction of the optical axis, thus achieving focusing adjustment. This involves no tilting of the element and the substrate 104 in either the fore-and-aft direction or the lateral direction.

It will be appreciated that since tilting of the element in the lateral direction can be adjusted independently from adjustment for the tilting in the fore-and-aft direction, the invention greatly facilitates an adjustment for tilting of the element as compared with the conventional mechanisms. In particular, for a light receiving element which is used to determine the distance, adjustment of tilting or focusing of the element can be effectively achieved in the course of an electrical evaluation.

With the light receiving element unit described above, the compatibility of the element with an associated processing unit can be adjusted through determination of a signal from the contacts 130, for the light receiving element unit in which the element 15 is mounted on the carrier which is in turn mounted on the fixing member 125. Subsequently, when the unit is mounted in the mirror box, a signal from the contacts 130 can be received from the mirror box. Furthermore, even when the mirror box is mounted within the body of the camera, a signal from the contacts 130 can be received through a lens mount since the contacts 130 are located within such mount. Accordingly, the invention enables the determination of an output signal from the light receiving element and hence adjustment for focusing purpose or avoidance of partial blurring of the element by the individual adjusting screws 112, 117 and 121, during assembly or after assembly of the camera. If a replacement of the light receiving element unit is required as a result of such determination and adjustment, the unit including the element, its associated fixing number and contacts can be freely dismounted even after the assembly of the camera, and thus can be freely changed on the basis of such unit. When it is desired to connect a measuring instrument to the contacts 130 during or after assembly, there is no likelihood that the unit will be deformed as a result of such connection since the contacts 130 are retained by rigid fixing member. It will thus be seen that the determination and adjustment during and after the assembly are made possible as considered from such mechanical aspect.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A single lens reflex camera having a mirror box and comprising:
   a substrate;
   a light receiving element mounted on said substrate;
   a first and second stationary shaft;
   a mechanism for adjusting tilting of said light receiving element, said adjusting mechanism being disposed within a bottom portion of said mirror box and which further comprises an element support plate having an end thereof pivotally connected with said substrate on which said light receiving element is mounted;
   a first lever having a first end thereof pivotally mounted on said first stationary shaft and a second end thereof pivotally connected to said element support plate;
   a second lever located on a side of said element support plate from said first lever and pivotally mounted on said second stationary shaft;
   a relay lever pivotally mounted on the second lever and abutting against said substrate and said element support plate at different radii of rotation from a point of pivotal connection; and
   means for adjusting the angular position of the first and second levers for tilting of the substrate in a lateral direction and in a fore-and-aft direction.

2. A single lens reflex camera having a mirror box and a carrier and comprising:
   a light receiving element unit disposed within a bottom portion of said mirror box, wherein said light receiving unit further comprises light receiving means carried by said carrier for receiving incident light and converting said incident light into a corresponding electrical signal;
   a fixing member fixedly mounted within the camera and holding the carrier;
   electrical contact means mounted on the fixing member for allowing an electrical signal from the light receiving means to be derived externally; and
   processing circuit means mounted on said carrier for converting an electrical signal from the light receiving means into a processed signal.

3. A single lens reflex camera according claim 2 wherein the light receiving means further comprises light receiving means for determining a distance to an object to be photographed.

4. A single lens reflex camera having a mirror box and a carrier, comprising:
   a light receiving element unit disposed within a bottom portion of said mirror box, wherein said light receiving unit further comprises light receiving means carried by said carrier for receiving incident light and converting said incident light into a corresponding electrical signal;
   a fixing member fixedly mounted within the camera and holding the carrier;
   electrical contact means mounted on the fixing member for allowing an electrical signal from the light receiving means to be derived externally; and
   processing circuit means mounted on said fixing member for converting an electrical signal from the light receiving means into a processed signal.

5. A single lens reflex camera according to claim 4, wherein the light receiving means further comprises means for determining a distance to an object to be photographed.

* * * * *